(12) United States Patent
Huang et al.

(10) Patent No.: US 11,343,003 B2
(45) Date of Patent: May 24, 2022

(54) MULTI-USER PAIRING METHOD AND APPARATUS, AND BASE STATION

(71) Applicant: Huawei Technologies Co., Ltd., Shenzhen (CN)

(72) Inventors: Xinye Huang, Shenzhen (CN); Fengchen Ouyang, Shanghai (CN); Zhijun Chao, Shanghai (CN); Senbao Guo, Xi'an (CN); Xinghun Liang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/990,018

(22) Filed: Aug. 11, 2020

(65) Prior Publication Data
US 2020/0374018 A1   Nov. 26, 2020

Related U.S. Application Data

(63) Continuation of application No. PCT/CN2019/071193, filed on Jan. 10, 2019.

(30) Foreign Application Priority Data

Feb. 11, 2018 (CN) .......................... 201810140127.1

(51) Int. Cl.
*H04B 7/06* (2006.01)
*H04B 17/373* (2015.01)
(Continued)

(52) U.S. Cl.
CPC ......... *H04B 17/373* (2015.01); *H04B 7/0413* (2013.01); *H04B 7/0617* (2013.01);
(Continued)

(58) Field of Classification Search
CPC .. H04B 17/336; H04B 17/373; H04B 7/0413; H04B 7/0452; H04B 7/0617; H04B 7/0632; H04L 5/0048; H04L 5/14
See application file for complete search history.

(56) References Cited

U.S. PATENT DOCUMENTS

2013/0229941 A1* 9/2013 Huang ................... H04W 72/08
370/252
2015/0036598 A1 2/2015 Kilpatrick, II et al.
2017/0195973 A1 7/2017 Jonsson et al.

FOREIGN PATENT DOCUMENTS

CN       1960556 A    5/2007
CN     103477568 A   12/2013
(Continued)

OTHER PUBLICATIONS

Duel-Hallen, "Fading Channel Prediction for Mobile Radio Adaptive Transmission Systems," vol. 95, No. 12, Proceedings of the IEEE, pp. 2299-2313, Institute of Electrical and Electronics Engineers, New York, New York, (Dec. 2007).

*Primary Examiner* — Minh Trang T Nguyen
(74) *Attorney, Agent, or Firm* — Leydig, Voit & Mayer, Ltd.

(57) ABSTRACT

Embodiments of this application disclose a multi-user pairing method and apparatus, and a base station. The method includes: obtaining an actual downlink channel parameter of user equipment UE at a moment t0; calculating a correlation coefficient between the actual downlink channel parameter at the moment t0 and an actual downlink channel parameter of the UE at a moment t0−Δt; determining a predicted downlink channel parameter of the UE at a moment t1 if the correlation coefficient is less than a preset threshold; and performing a multi-user pairing operation based on the predicted downlink channel parameter at the moment t1.

14 Claims, 3 Drawing Sheets

(51) Int. Cl.
*H04B 17/336* (2015.01)
*H04B 7/0413* (2017.01)
*H04L 5/00* (2006.01)
*H04L 5/14* (2006.01)

(52) U.S. Cl.
CPC ......... *H04B 7/0632* (2013.01); *H04B 17/336* (2015.01); *H04L 5/0048* (2013.01); *H04L 5/14* (2013.01)

(56) References Cited

FOREIGN PATENT DOCUMENTS

| | | | |
|---|---|---|---|
| CN | 103997362 | A | 8/2014 |
| CN | 104270180 | A | 1/2015 |
| CN | 104378146 | A | 2/2015 |
| KR | 20080101014 | A | 11/2008 |
| WO | 2012065278 | A1 | 5/2012 |

* cited by examiner

MULTI-USER PAIRING METHOD AND APPARATUS, AND BASE STATION

CROSS-REFERENCE TO RELATED APPLICATIONS

This application is a continuation of International Application No. PCT/CN2019/071193, filed on Jan. 10, 2019, which claims priority to Chinese Patent Application No. 201810140127.1, filed on Feb. 11, 2018. The disclosures of the aforementioned applications are hereby incorporated by reference in their entireties.

TECHNICAL FIELD

This application relates to the field of communications technologies, and in particular, to a multi-user pairing method and apparatus, and a base station.

BACKGROUND

It is well known that, between a base station and user equipment (UE) in coverage of the base station, a transmit end device (e.g., the UE) transmits data by transmitting an electromagnetic wave to a receive end device (e.g., the base station). Specifically, the transmit end device transmits the electromagnetic wave by using an antenna of the transmit end device, and a to-be-sent data stream is carried on the electromagnetic wave. Because the electromagnetic wave points to a transmission channel corresponding to the data stream, the electromagnetic wave can carry the data stream and be transmitted to the receive end device through the corresponding channel. The base station maintains a plurality of antennas, and each UE may be considered as one single antenna when UEs send uplink data streams to the base station. Therefore, the UEs and the plurality of antennas of the base station form a virtual multiple-input multiple-output (MIMO) system. In addition, the MIMO system supports sending of a plurality of data streams by using a same time-frequency resource.

When the base station sends a plurality of downlink data streams by using a same time-frequency resource, because different UEs correspond to different data streams and different downlink channels, before sending the plurality of downlink data streams, the base station needs to correspondingly separate the downlink data streams for each UE, and perform beamforming on electromagnetic waves that carry the downlink data streams, so that each electromagnetic wave points to a downlink channel corresponding to the UE. This process is referred to as multi-user pairing. Based on this, a downlink channel currently corresponding to each UE is a necessary parameter for performing multi-user pairing. However, generally, the base station cannot directly learn of the downlink channel of each UE, and each UE usually periodically sends pilot information to the base station. Therefore, in a common practice, for example, in a system that is based on a time division duplexing (TDD) technology, the base station obtains a downlink channel from pilot information last sent by each UE, and uses the downlink channel as a downlink channel currently corresponding to the corresponding UE.

In addition, if UE in the coverage of the base station moves, a downlink channel corresponding to the UE changes continuously. However, duration required for a significant channel change is several milliseconds (ms), and a periodicity for sending pilot information by the UE to the base station is dozens of milliseconds. Based on this, if UE is moving, a downlink channel that is of the UE and that is obtained by the base station is inconsistent with a downlink channel actually used by the UE, thereby not only reducing beamforming accuracy of an electromagnetic wave corresponding to the UE, and deteriorating receiving performance of the UE, but also further increasing interference caused by an electromagnetic wave of another UE to the electromagnetic wave of the UE, and further deteriorating the receiving performance of the UE.

SUMMARY

Embodiments of this application provide a multi-user pairing method and apparatus, and a base station, to resolve a problem where the receiving performance of a UE deteriorates when the UE is in motion.

According to a first aspect, an embodiment of this application provides a multi-user pairing method. The method includes: obtaining an actual downlink channel parameter of UE at a moment t0; calculating a correlation coefficient between the actual downlink channel parameter at the moment t0 and an actual downlink channel parameter of the UE at a moment t0−Δt, where Δt is less than or equal to a preset time length; if the correlation coefficient is less than a preset threshold, determining a predicted downlink channel parameter of the UE at a moment t1 based on the actual downlink channel parameter at the moment t0 and several consecutive actual downlink channel parameters that are adjacent to the actual downlink channel parameter at the moment t0 and that are before the moment to, where the moment t1 is a sending moment after the moment t0; and performing a multi-user pairing operation based on the predicted downlink channel parameter at the moment t1.

It should be understood that the moment t0 is a sounding moment closest to a current moment. However, in this embodiment of this application, a base station can determine whether an actual downlink channel at the moment t0 changes compared with an actual downlink channel before the moment t0, based on correlation between the actual downlink channel parameter at the moment t0 and the actual downlink channel parameter at the moment t0−Δt, thereby determining whether corresponding UE is moving. When the UE is moving, a downlink channel parameter of a moment after the moment t0 is predicted based on several actual downlink channel parameters, and the multi-user pairing operation is performed based on the predicted downlink channel parameter.

In this implementation, before the multi-user pairing operation is performed, whether the corresponding UE is moving can be identified, so that a relatively accurate downlink channel parameter of the corresponding UE can be determined based on different identification results, thereby improving accuracy of a pairing parameter of the moving UE and improving receiving performance of the moving UE.

With reference to the first aspect, in a first possible implementation of the first aspect, the performing a multi-user pairing operation based on the predicted downlink channel parameter at the moment t1 includes: performing the multi-user pairing operation by using the predicted downlink channel parameter at the moment t1 as a calculation parameter of the UE; or generating a correction parameter based on the predicted downlink channel parameter at the moment t1 and the actual downlink channel parameter at the moment t0; and performing the multi-user pairing operation based on the correction parameter.

Specifically, the base station may perform the multi-user pairing operation based on the predicted downlink channel parameter at the moment t1 by using two methods. Method 1: Using the predicted downlink channel parameter at the moment t1 as a real downlink channel parameter of the UE at the moment t1 to perform the multi-user pairing operation. Method 2: Generating a correction parameter based on the predicted downlink channel parameter at the moment t1 and the actual downlink channel parameter at the moment t0, using the correction parameter to correct a pairing algorithm, and then performing the multi-user pairing operation based on the corrected pairing algorithm.

In this implementation, in a scenario in which the UE is moving, the multi-user pairing operation can be performed by using a relatively accurate downlink channel parameter of the moving UE, thereby improving accuracy of a pairing parameter of the moving UE and improving receiving performance of the moving UE.

With reference to the first aspect, in a second possible implementation of the first aspect, the correction parameter $\rho(t1)$ is defined as:

$$\rho(t1) = \frac{|H(t1)H^H(t0)|^2}{|H(t1)|^2},$$

where H(t1) is the predicted downlink channel parameter at the moment t1, and $H^H(t0)$ is a conjugate transpose of the actual downlink channel parameter at the moment t0; or, the correction parameter $\rho(t1)$ is defined as: $\rho(t1)=abs[V^H(t1)V(t0)]$, where V(t0) is a first single-user weight that is of the UE and that is calculated based on the actual downlink channel parameter at the moment t0, V (t1) is a second single-user weight that is of the UE and that is calculated based on the predicted downlink channel parameter H(t1) at the moment t1, and $V^H(t1)$ is a conjugate transpose of the second single-user weight V(t1) of the UE.

With reference to the first aspect, in a third possible implementation of the first aspect, when $$\rho(t1) = \frac{|H(t1)H^H(t0)|^2}{|H(t1)|^2},$$

the performing the multi-user pairing operation based on the correction parameter includes: generating a target single-user beamforming SU BF weight based on the correction parameter $\rho(t1)$; and performing the multi-user pairing operation based on the target SU BF weight; or performing the multi-user pairing operation based on the correction parameter $\rho(t1)$ and the actual downlink channel parameter at the moment t0.

In this implementation, in a scenario in which the UE is moving, the multi-user pairing operation can be performed by using a relatively accurate downlink channel parameter of the moving UE, thereby improving accuracy of a pairing parameter of the moving UE and improving receiving performance of the moving UE.

With reference to the first aspect, in a fourth possible implementation of the first aspect, when $\rho(t1)=abs[V^H(t1)V(t0)]$, a multi-user beamforming (MU BF) weight $W^{MU-BF}$ used for the multi-user pairing operation meets is defined as $W^{MU-BF}=V(V^H V+D(\rho(t1)))$, and D is a diagonal add-in; and a correction value $SINR_{x,y}$ used for the multi-user pairing operation, after UE y pairing on an $x^{th}$ stream is defined as $SINR_{x,y}=\alpha_{x,y}(\rho(t1))*SINR_y*\Delta SINR_{x,y}$, where $\Delta SINR_{x,y}$ is a correction value before the UE y pairing on the $x^{th}$ stream, $SINR_y$ is an SINR value determined based on a channel quality indicator CQI of the UE y, and $\alpha_{x,y}$ is an SINR correction coefficient after the UE y pairing on the $x^{th}$ stream.

With reference to the first aspect, in a fifth possible implementation of the first aspect, the correlation coefficient K(t0) between the actual downlink channel parameter at the moment t0 and the actual downlink channel parameter of the UE at the moment t0−Δt is defined as:

$$K(t0) = \frac{|H(t0)H^H(t0 - \Delta t)|^2}{|H(t0)|^2},$$

where $H^H(t0-\Delta t)$ is a conjugate transpose of the actual downlink channel parameter of the UE at the moment t0−Δt.

With reference to the first aspect, in a sixth possible implementation of the first aspect, the determining a predicted downlink channel parameter H(t1) at a moment t1 based on the actual downlink channel parameter at the moment t0 and several consecutive actual downlink channel parameters that are adjacent to the actual downlink channel parameter at the moment t0 and that are before the moment t0 includes:

$$H(t1) = \sum_{ti=tn}^{t0} A(ti)H(ti),$$

where tn is the earliest moment among moments corresponding to the several actual downlink channel parameters, A(ti) is a prediction coefficient, and H(ti) is an actual downlink channel parameter at a moment ti; or H(t1) is determined, in an interpolation manner, based on the actual downlink channel parameter at the moment t0 and a predicted downlink channel parameter H(t2) at a moment t2, where t2 is equal to t0+t, t is a periodicity for obtaining the actual downlink channel parameter, t2>t1, and $$H(t2) = \sum_{ti=tn}^{t0} A(ti)H(ti),$$

where tn is the earliest moment among moments corresponding to the several actual downlink channel parameters, A(ti) is a prediction coefficient, and H(ti) is an actual downlink channel parameter at a moment ti.

With reference to the first aspect, in a seventh possible implementation of the first aspect, the obtaining an actual downlink channel parameter at a moment t0 includes: receiving, at the moment to, an actual downlink channel parameter sent by the UE; or receiving, at the moment to, pilot information sent by the UE; and obtaining an actual downlink channel parameter by parsing the pilot information. According to a second aspect, an embodiment of this application provides a multi-user pairing apparatus. The apparatus includes modules configured to perform the method steps in the first aspect and the implementations of the first aspect.

According to a third aspect, an embodiment of this application provides a base station. The base station includes a transceiver, a processor, and a memory. The transceiver, the processor, and the memory may be connected by using a bus system. The memory is configured to store a program, an instruction, or code, and the processor is configured to execute the program, the instruction, or the code in the memory to complete the method in the first aspect or any possible design in the first aspect.

According to a fourth aspect, an embodiment of this application provides a computer-readable storage medium. The computer-readable storage medium stores an instruction, and when the instruction is run on a computer, the computer is enabled to perform the method in the first aspect or any possible design of the first aspect.

To resolve the problem in the prior art, in the embodiments of this application, after obtaining the actual downlink channel parameter of the UE at the moment t0, the base station determines whether the UE moves, based on the correlation between the actual downlink channel parameter at the moment t0 and the actual downlink channel parameter of the UE at the moment t0−Δt. If it is determined that the UE moves, the base station predicts a downlink channel parameter corresponding to a next sending moment, based on the actual downlink channel parameter at the moment t0 and the several consecutive actual downlink channel parameters that are adjacent to the actual downlink channel parameter at the moment t0 and that are before the moment t0, and performs the multi-user pairing operation based on the predicted downlink channel parameter. It can be learned that even if the UE cannot send, to the base station in time, a parameter of a downlink channel actually used by the UE, the base station can identify, after receiving the actual downlink channel parameter of the UE, whether the UE moves. In addition, when the UE moves, the base station generates the predicted downlink channel parameter, so that even if UE in coverage of the base station moves, the base station can still determine a relatively accurate downlink channel of the moving UE, thereby improving accuracy of a pairing parameter of the moving UE and improving receiving performance of the moving UE.

DESCRIPTION OF EMBODIMENTS

Figure 1:
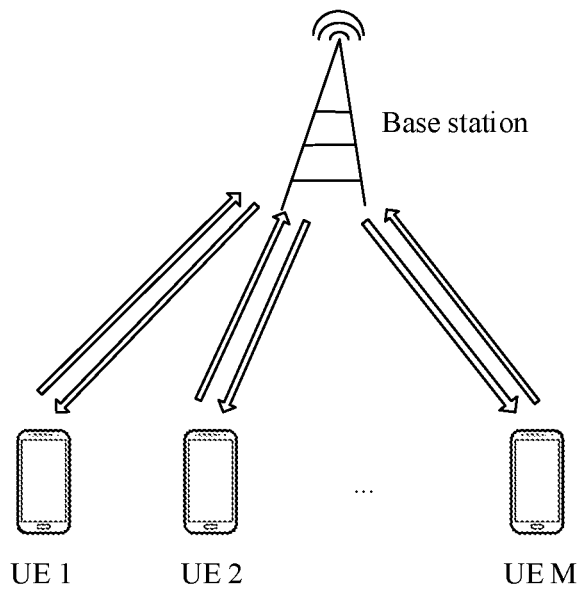
FIG. 1 is a schematic diagram of an implementation scenario according to an embodiment of this application.

Generally, a MIMO system supports a plurality of antennas in using a same frequency and simultaneously sending data streams. Based on this, a working process of the MIMO system is described in detail with reference to an implementation scenario diagram shown in FIG. 1. Referring to FIG. 1, an example in which each UE receives a single data stream is used. Each UE may be considered as one single antenna, and M UEs may be considered as M single antennas. An antenna array is usually disposed in a base station, and the antenna array includes N antennas. M and N are integers greater than 1. Based on this, the antenna array including the N antennas and the M UE single antennas form a MIMO antenna system.

When the base station sends downlink data streams to the UEs, the base station sends M electromagnetic waves by using the antenna array, where each of the M electromagnetic waves carries one downlink data stream, and the M electromagnetic waves are transmitted, through downlink channels corresponding to the M UEs, to corresponding UEs one by one. Because the M electromagnetic waves are transmitted simultaneously and on a same frequency, after the antenna array generates the M electromagnetic waves, the base station needs to divide the M electromagnetic waves in a spatial angle, based on the downlink channels corresponding to the UEs, to be specific, perform beamforming on the M electromagnetic waves based on channel parameters of the downlink channels, to ensure that each of the M electromagnetic waves points to a corresponding downlink channel. This process is multi-user pairing.

Figure 2:
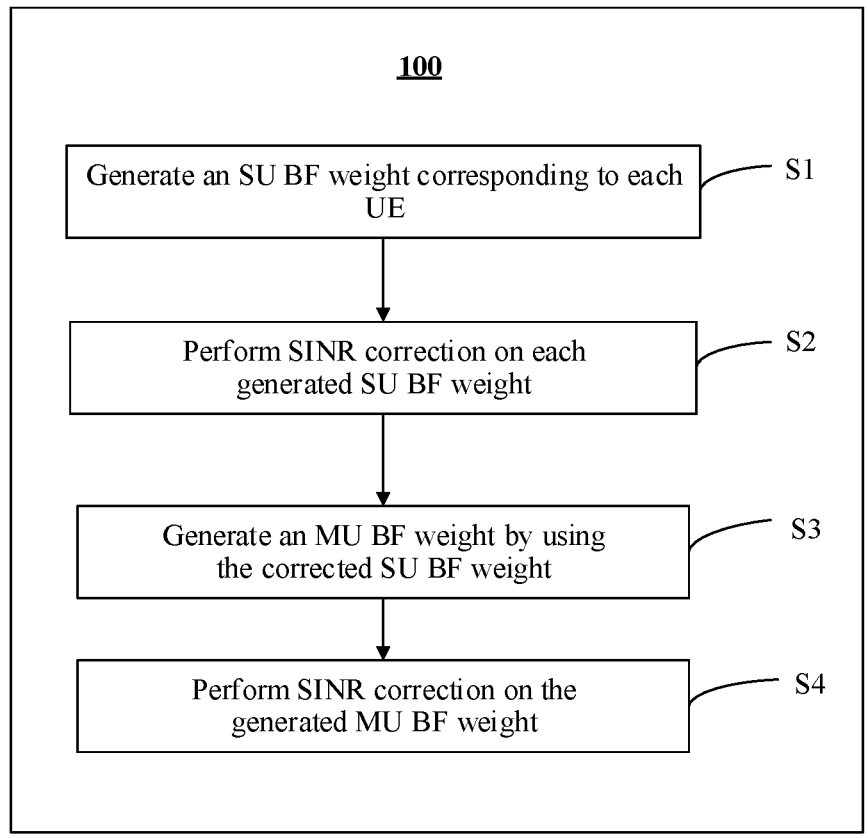
FIG. 2 is a method flowchart of a common multi-user pairing method according to an embodiment of this application.

FIG. 2 is a method flowchart of a common multi-user pairing method according to an embodiment of this application. A method 100 shown in FIG. 2 includes the following steps.

Step S1: Generate a single-user beamforming (SU BF) weight corresponding to each UE.

With reference to the foregoing descriptions of the implementation scenario, it can be learned that a device for performing multi-user pairing is a base station, and the UE is UE in coverage of the base station.

It should be noted that the base station generally cannot directly learn of a downlink channel parameter of the UE. Therefore, in a TDD system, an uplink channel parameter $H^{up}$ of the UE is obtained, from pilot information sent by the UE, based on channel reciprocity of a TDD technology. Further, a downlink channel parameter $H^{down}$ of the UE is obtained based on the uplink channel parameter $H^{up}$. Specifically, $H^{down}=H^{upT}$, to be specific, based on TDD reciprocity, the downlink channel parameter H down of the UE is a transpose of the uplink channel parameter $H^{up}$ of the UE.

Further, an SU BF weight of the UE may be calculated according to a preset algorithm. Specifically, using an example in which a rank of a channel matrix is 1, singular value decomposition (SVD) is performed on a downlink channel matrix, $H^{down}=U\lambda V^H$, where U is an equalization matrix on a UE side, λ is a parameter of SVD decomposition, $V^H$ is a conjugate transpose of a weight matrix of the UE, and an eigenvector corresponding to the maximum eigenvalue in the matrix V is the SU BF weight of the UE.

Step S2: Perform signal to interference plus noise ratio (SINR) correction on each generated SU BF weight.

Multi-user pairing is essentially generating a multi-user beamforming (MU BF) weight of each UE, and the MU BF weight is usually generated by using the SU BF weight of each UE as a calculation basis. Therefore, accuracy of the SU BF weight is particularly important in a multi-user pairing process.

It should be noted that, when generating the SU BF weight, the base station usually combines an SINR fed back by the UE, and the SINR fed back by the UE is different from an SINR corresponding to the UE when the base station sends a downlink data stream. Based on this, before multi-user pairing is performed by using the SU BF weight as data, SINR correction needs to be first performed on the SU BF weight.

Specifically, the base station may determine a corresponding SINR value by looking up a table based on a channel quality indicator (CQI) reported by the UE, and then a SINR correction value of the SU BF weight is obtained by multiplying the SINR value by ΔSINR. In an example in which a rank is 1, $$\Delta SINR = \frac{\|\overline{H} W_{BF}\|_F^2}{\|\overline{H} W_{wide}\|_F^2},$$

and in the formula, $\overline{H}$ is a channel coefficient on which baseband weighting is not performed, and $W_{BF}$ is an SU BF weight that the UE has when a dimension of the UE is N×1, where N is a quantity of transmit antennas of the base station. $W_{wide}$ is beam weighting used when the UE reports the CQI. For example, in an example of single-port sending, a dimension of $W_{wide}$ is N×1. $\|\bullet\|_F^2$ is a sum of modular squares of all elements in the matrix.

Step S3: Generate the MU BF weight by using the corrected SU BF weight.

Specifically, after the corrected SU BF weight of each UE is obtained, as mentioned above, if the quantity of transmit antennas of the base station is N, the maximum quantity of paired layers is N. Based on this, the example in which the rank is 1 is still used. It is assumed that P UEs have been paired on a resource block (RB) or a resource block group (RBG), and it is considered that a quantity of paired layers in this case is P.

If P is equal to N, multi-user pairing ends. If P is less than N, a set formed by the P paired UEs is defined as X. It is assumed that there are still Q to-be-paired UEs, the Q to-be-paired UEs form a set Y. Then, each of the Q UEs in the set Y separately forms a set with the P UEs in the set X, to obtain Q sets, and the Q sets each include P+1 UEs. Further, for P+1 UEs in each of the Q sets, MU BF weights of the P+1 UEs are calculated on each RB or RBG according to an algorithm $W^{MU-BF}$ $V(V^H V+D)^{-1}$. V is an SU BF weight matrix of the P+1 UEs, $V^H$ is a conjugate transpose of V, and D is a diagonal add-in.

Step S4: Perform SINR correction on the generated MU BF weight.

Following step S3, after the MU BF weights of the P+1 UEs in the Q sets are separately obtained, a SINR correction value of each UE after pairing is calculated on each RB or RBG. Specifically, in each RBG, a SINR correction value after UE y pairing on the $x^{th}$ stream $SINR_{x,y} = \alpha_{x,y} *$ $SINR_y * \Delta SINR_{x,y}$, where $\Delta SINR_{x,y}$ is an SINR correction value before the UE y pairing on the $x^{th}$ stream, $SINR_y$ is an SINR value obtained by the base stations by looking up a table based on a CQI reported by the UE y, and $\alpha_{x,y}$ is an SINR correction factor after the UE y pairing on the $x^{th}$ stream.

Specifically, $$\alpha_{x,y} = \frac{w_{x,y}^H R_y w_{x,y}}{u_{x,y}^H R_y u_{x,y}},$$

where $R_y$ is a downlink channel covariance matrix of the UE y, $u_{x,y}$ is an SU BF weight before the UE y pairing, $w_{x,y}$ is an MU BF weight after the UE y pairing, and n is a total quantity of streams of the UE y.

Further, after obtaining the SINR correction value of each UE, the base station may learn, by looking up a table, of a modulation and coding scheme (MCS) corresponding to the SINR correction value of the corresponding UE, and further learn of an instantaneous rate of the corresponding UE based on the corresponding MCS. Then, a proportional fair (PF) priority of each UE is obtained. Then, PF priorities of P+1 UEs in each of the Q sets are accumulated to obtain a sum of the PF priorities of the P+1 UEs, and a set with the maximum sum of PF priorities is selected from the Q sets. Further, it is determined whether the maximum sum of PF priorities has a positive gain based on a sum of PF priorities of the P UEs in the set X. If there is a positive gain, the P+1 UEs are used as paired users of the P+1 layers. If there is no positive gain, it means that only P layers can be paired on the RB or RBG, and multi-user pairing ends.

On each paired layer, the foregoing process of calculating a gain is repeatedly performed until there is no gain or the maximum quantity N of paired layers is reached, and the multi-user pairing operation is ended.

It can be learned from the descriptions of step S1 that an execution condition of the method 100 is that the base station receives the pilot information sent by the UE. The UE usually sends pilot information to the base station once at each sounding moment. When the base station needs to send a data stream to the UE, the base station obtains, by parsing the most recently received pilot information, a downlink channel parameter of the corresponding UE.

Based on this, if UE in the coverage of the base station moves, because a shortest time interval for sending pilot information by the UE to the base station is dozens of milliseconds, and a channel switching speed of the UE is several milliseconds in the moving process, a downlink channel parameter that is of the UE, and that is obtained by the base station after the UE sends pilot information last time and before the UE sends next pilot information, is not a parameter of a downlink channel actually used by the UE. As a result, when the base station performs multi-user pairing, not only is an obtained MU BF weight of the UE is inaccurate, and receiving performance of the UE is reduced, but also the downlink channel parameter of the UE is inaccurate, and interference of another UE to the UE is also caused. In view of this, a person skilled in the art obtains the technical solutions in the embodiments of this application in a research and development process.

The following describes the embodiments of this application with reference to accompanying drawings.

Figure 3:
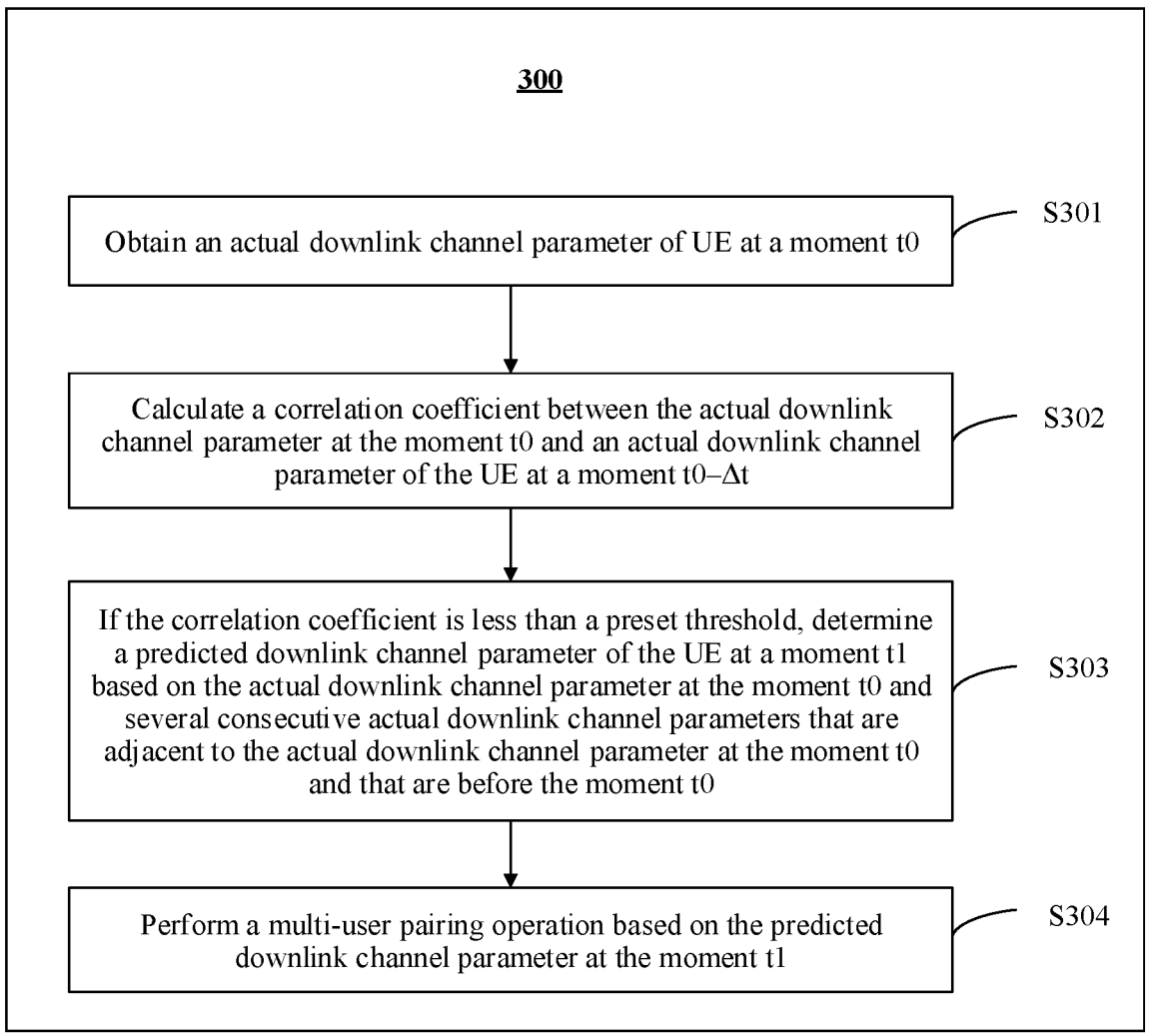
FIG. 3 is a method flowchart of a multi-user pairing method according to an embodiment of this application.

FIG. 3 is a method flowchart of a multi-user pairing method according to an embodiment of this application. In a method 300 provided in this embodiment of this application, a mobility identification function of UE is added based on the method 100, so that a downlink channel parameter of the UE can be predicted based on an identification result, and further, accuracy of multi-user pairing can be improved. The method 300 includes the following steps.

Step S301: Obtain an actual downlink channel parameter of the UE at a moment to.

With reference to an implementation scenario of this embodiment of this application, an execution device of this embodiment of this application is a base station, and the UE is UE in coverage of the base station. In this embodiment of this application, a channel parameter includes data used to represent a channel location and channel strength, for example, may be an amplitude and a phase of a channel. The downlink channel parameter of the UE may be an amplitude and a phase of a channel used to transmit a downlink data stream of the UE. The actual downlink channel parameter of the UE is a real downlink channel parameter corresponding to the UE. Correspondingly, the actual downlink channel parameter of the UE at the moment t0 is a real downlink channel parameter of the UE that is obtained by the base station at the moment t0.

Specifically, in this embodiment of this application, a manner in which the base station obtains the actual downlink channel parameter of the UE at the moment t0 may be, but is not limited to, the following two manners.

Manner 1: The base station receives, at the moment t0, pilot information sent by the UE, parses the pilot information to obtain an actual uplink channel parameter of the UE at this moment, and further obtains the actual downlink channel parameter of the UE based on TDD reciprocity and the actual uplink channel parameter.

The pilot information sent by the UE to the base station may be, but is not limited to, a sounding reference signal (SRS). In addition, that the base station obtains the actual uplink channel parameter by parsing the pilot information and obtains the actual downlink channel parameter based on TDD reciprocity is a technology well known by a person skilled in the art, and details are not described herein in this embodiment of this application.

Manner 2: In this embodiment of this application, at the moment t0, the UE directly obtains the actual downlink channel parameter of the UE, and then sends the obtained actual downlink channel parameter to the base station.

Specifically, the UE may obtain the actual downlink channel parameter of the UE in a plurality of manners, and this is a relatively mature technology in the art. Details are not described herein in this embodiment of this application.

Figure 4:
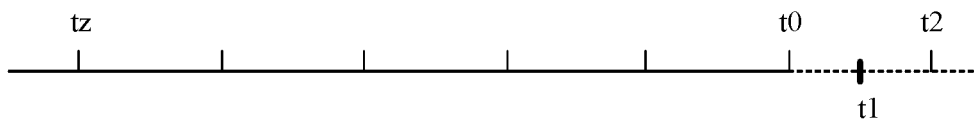
FIG. 4 is a time sequence diagram of obtaining, by a base station, an actual downlink channel parameter of UE according to an embodiment of this application.

It should be understood that the latest actual downlink channel parameter of the UE is a key parameter in this embodiment of this application. Therefore, in this embodiment of this application, the moment t0 may be understood as a sounding moment closest to a current moment. FIG. 4 is a time sequence diagram of obtaining, by the base station, the actual downlink channel parameter of the UE, where the moment t0 is the current moment or a sounding moment closest to the current moment. The moment t0 is used as a demarcation point, a previous moment is a moment earlier than the moment t0, and a next moment is a future moment.

Step S302: Calculate a correlation coefficient between the actual downlink channel parameter at the moment t0 and an actual downlink channel parameter of the UE at a moment t0−Δt.

The correlation coefficient is a coefficient that represents a degree of a change of the actual downlink channel parameter at the moment t0 relative to the actual downlink channel parameter at the moment t0−Δt. A smaller correlation coefficient indicates a larger change of the actual downlink channel parameter at the moment t0 relative to the actual downlink channel parameter at the moment t0−Δt. In this way, the correlation coefficient can be used to determine whether corresponding UE is moving. Δt is a value less than or equal to a preset time length. The preset time length is a preset time period, and an actual downlink channel parameter at a moment that is the time period from the moment t0 is determined as an optional reference downlink channel parameter for calculating the correlation coefficient.

Specifically, when a UE moves, a downlink channel corresponding to the UE continuously changes. Based on this, the actual downlink channel parameter at the moment t0−Δt represents a channel before the change, and the actual downlink channel parameter at the moment t0 represents a channel after the change. In addition, the faster the UE moves, the smaller correlation between the actual downlink channel parameters at the two moments. Based on this, in this embodiment of this application, whether the UE is moving may be determined through the correlation coefficient between the actual downlink channel parameters at the two moments.

It should be understood that if the preset time length is excessively short, even if the corresponding UE moves, the correlation between the actual downlink channel parameter at the moment t0 and the actual downlink channel parameter at the moment t0−Δt is still relatively large, and consequently, whether the UE is moving cannot be accurately indicated. However, if the preset time length is excessively long, the UE may have moved within a corresponding time period. Even if the UE does not move currently, the correlation between the actual downlink channel parameter at the moment t0 and the actual downlink channel parameter at the moment t0−Δt is still relatively small, and consequently, a reliability of a determined result is relatively low.

Based on this, in this embodiment of this application, a range of the preset time length may be set to 100 ms to 150 ms such as, for example, 120 ms. With reference to FIG. 4, an actual downlink channel parameter received 120 ms before the moment t0 is determined as a reference parameter for calculating the correlation coefficient.

Further, it should be noted that, in a state of being connected to a network and using the network, the UE sends pilot information or an actual downlink channel parameter to the base station based on a sounding periodicity. Therefore, the base station can obtain the actual downlink channel parameter of the UE based on a corresponding sounding periodicity, so that the base station may use, as a reference parameter for calculating the correlation coefficient, an actual downlink channel parameter corresponding to a moment earlier than the moment t0 by the preset time length. However, when the UE is not connected to the network, or there is no communication requirement between the UE and the base station, the UE does not send pilot information or an actual downlink channel parameter to the base station. In this case, after obtaining, at a moment, an actual downlink channel parameter, the base station may obtain, after the moment, a next actual downlink channel parameter of corresponding UE at an interval of a plurality of sounding periodicities. Based on this, at a moment 100 ms to 150 ms before the actual downlink channel parameter at the moment t0, the base station may not receive any data. In this scenario, in this embodiment of this application, an actual downlink channel parameter that is first obtained within 100 ms to 150 ms before the moment t0 may be used as a reference parameter for calculating the correlation coefficient.

For example, with reference to FIG. 4, if the base station has obtained an actual downlink channel parameter at a moment 120 ms before the moment t0, the base station calculates a correlation coefficient between a corresponding actual downlink channel parameter and the actual downlink channel parameter at the moment t0. If the base station has not received any data at the moment 120 ms before the moment t0, the base station calculates a correlation coefficient between the actual downlink channel parameter at the moment t0 and an actual downlink channel parameter that is first obtained from a moment t0−120 ms to the moment t0, for example, an actual downlink channel parameter obtained at a moment t0−80 ms.

Further, if the base station receives the actual downlink channel parameter based on the sounding periodicity, the base station may obtain three to four actual downlink channel parameters within 100 ms to 150 ms. Based on this, if the base station receives the actual downlink channel parameter based on the sounding periodicity, the third or fourth adjacent and sequential actual downlink channel parameter before the moment t0 may also be directly used as a reference parameter for calculating the correlation coefficient.

Specifically, the correlation coefficient K(t0) between the actual downlink channel parameter at the moment t0 and the actual downlink channel parameter at the moment t0−Δt meets:

$$K(t0) = \frac{|H(t0)H^H(t0 - \Delta t)|^2}{|H(t0)|^2},$$

where H(t0) is the downlink channel parameter at the moment t0, and $H^H$(t0−Δt) is a conjugate transpose of the downlink channel parameter at the moment t0−Δt.

Certainly, the foregoing manner of determining the correlation coefficient by calculating a modulus square of the actual downlink channel parameter at the moment t0 and the actual downlink channel parameter at the moment t0−Δt is merely an optional implementation of this application. In this embodiment of this application, another applicable calculation manner may be further used to determine a correlation coefficient between two downlink channel parameters. Specifically, details are not described herein in this embodiment of this application.

Step S303: If the correlation coefficient is less than a preset threshold, determine a predicted downlink channel parameter of the UE at a moment t1 based on the actual downlink channel parameter at the moment t0 and several consecutive actual downlink channel parameters that are adjacent to the actual downlink channel parameter at the moment t0 and that are before the moment to.

The preset threshold is a threshold preset based on a moving speed of the UE and an attenuation ratio of the channel, and is used to detect whether the UE is moving. Specifically, it can be learned from the descriptions of step S302 that a faster moving speed of the UE indicates a smaller correlation coefficient. Based on this, if the correlation coefficient is less than the preset threshold, it is considered that the corresponding UE is moving. If the correlation coefficient is greater than the preset threshold, it is considered that the corresponding UE is not moving currently. In this embodiment of this application, a value range of the preset threshold may be 0.5 to 0.7. The moment t1 is a moment, at which a downlink data stream is sent, after the moment t0.

Further, if the base station identifies that the UE is moving, a downlink channel parameter of the UE after the moment t0 may be predicted based on the actual downlink channel parameter at the moment t0 and the several consecutive actual downlink channel parameters that are adjacent to the actual downlink channel parameter at the moment t0 and that are before the moment t0, so that related operations of multi-user pairing can be performed based on the predicted downlink channel parameter, thereby further improving accuracy of multi-user pairing.

It should be noted that the base station sends a data stream to the UE once at each transmission time interval (TTI), and the TTI may be less than or equal to one sounding periodicity. Based on this, in this embodiment of this application, downlink channel parameter prediction is performed based on different scenarios by using the following method.

When the TTI is equal to one sounding periodicity, the predicted downlink channel parameter H(t1) at the moment t1 is defined as:

$$H(t1) = \sum_{ti=tn}^{t0} A(ti)H(ti),$$

where tn is the earliest moment among moments corresponding to the several actual downlink channel parameters, A(ti) is a prediction coefficient, and H(ti) is an actual downlink channel parameter at a moment ti.

When the TTI is less than one sounding periodicity, in this embodiment of this application, a predicted downlink channel parameter H (t2) at a moment t2 is calculated, and then the predicted downlink channel parameter H(t1) at the moment t1 is determined in an interpolation manner based on the actual downlink channel parameter at the moment t0 and the predicted downlink channel parameter H(t2) at the moment t2. In this embodiment of this application, the sounding periodicity is, for example, t, t2 is equal to t0+t, and $$H(t2) = \sum_{ti=tn}^{t0} A(ti)H(ti),$$

where tn is the earliest moment among moments corresponding to the several actual downlink channel parameters, A(ti) is a prediction coefficient, and H(ti) is an actual downlink channel parameter at a moment ti.

It should be noted that, when the predicted downlink channel parameter at the moment t1 is determined, if a quantity of selected actual downlink channel parameters is excessively large, an actual downlink channel corresponding to a moment that is excessively earlier than the moment t0 is relatively little correlated with an actual downlink channel at the moment t0, and consequently, accuracy of the predicted downlink channel parameter at the moment t1 is affected. However, if the quantity of selected actual downlink channel parameters is excessively small, accuracy of the predicted downlink channel parameter at the moment t1 is also relatively poor. Therefore, an optimal quantity, such as five, of selected actual downlink channel parameters, may be usually determined in a manner of machine learning or the like.

Certainly, the several consecutive actual downlink channel parameters adjacent to the actual downlink channel parameter at the moment t0 in this embodiment of this application refer to a scenario in which the base station continuously obtains actual downlink channel parameters based on the sounding periodicity. If the base station does not obtain, before a moment t0−tx, an actual downlink channel parameter of the UE for a long time, and starts to continuously obtain actual downlink channel parameters based on the sounding periodicity from the moment t0−tx, only an actual downlink channel parameter received after the moment t0−tx is used as data for determining the predicted downlink channel parameter at the moment t1.

For example, with reference to FIG. 4, in an optional embodiment, the base station does not obtain a downlink channel parameter of target UE within 10 minutes before a moment tz. Starting from the moment tz, the base station obtains the actual downlink channel parameter based on the sounding periodicity. When calculating the predicted downlink channel parameter at the moment t1, the base station selects data for calculation from actual downlink channel parameters obtained from the moment tz to the moment t0.

Further, if a total quantity of actual downlink channel parameters obtained from the moment tz to the moment t0 is less than a specified optimal quantity, all the actual downlink channel parameters obtained from the moment tz to the moment t0 are used to calculate the predicted downlink channel parameter at the moment t1.

Step S304: Perform a multi-user pairing operation based on the predicted downlink channel parameter at the moment t1.

As described in the foregoing step of the method 300, if the base station identifies, based on the correlation coefficient, that the UE does not move, the base station performs the multi-user pairing operation on the UE according to the method 100. If the base station identifies that the UE is moving, the base station may perform the multi-user pairing operation by using the predicted downlink channel parameter as a reference.

Specifically, that the moment t1 is a TTI moment is used as an example. The base station may perform the multi-user pairing operation based on the predicted downlink channel parameter at the moment t1 by using a plurality of methods. The plurality of methods may be classified into two types. Method 1: Using the predicted downlink channel parameter at the moment t1 as a real downlink channel parameter of the UE at the moment t1 to perform the multi-user pairing operation according to the method 100. Method 2: Generating a correction parameter based on the predicted downlink channel parameter at the moment t1 and the actual downlink channel parameter at the moment t0, using the correction parameter to correct a corresponding pairing algorithm in the method 100, and then performing the multi-user pairing operation based on the corrected pairing algorithm.

For Method 2, this embodiment of this application provides three different implementations. The following describes the several different implementations in detail.

Manner 1: When the correction parameter ρ(t1) is defined as $$\rho(t1) = \frac{|H(t1)H^H(t0)|^2}{|H(t1)|^2},$$

the correction parameter ρ(t1) is used to correct the algorithm for generating the SU BF weight in the method 100, then a target SU BF weight is generated according to the corrected SU BF weight algorithm, and other operations are performed based on step S2, step S3, and step S4 in the method 100.

H(t1) is the predicted downlink channel parameter of the UE at the moment t1, and $H^H$(t0) is a conjugate transpose of the actual downlink channel parameter at the moment t0.

Manner 2: When the correction parameter ρ(t1) is defined as $$\rho(t1) = \frac{|H(t1)H^H(t0)|^2}{|H(t1)|^2},$$

the correction parameter ρ(t1) is used to correct an algorithm in each of step S1, step S2, step S3, and step S4 in the method 100, and then the multi-user pairing operation is performed according to the corrected pairing algorithms.

Manner 3: When the correction parameter ρ(t1) is defined as ρ(t1)=abs[$V^H$(t1)V(t0)], algorithms in step S3 and step S4 in the method 100 are corrected, to obtain $W^{MU-BF}$=V($V^H$V+D(ρ(t1))) and SINR$_{x,y}$=α$_{x,y}$(ρ(t1))*SINR$_y$*ΔSINR$_{x,y}$. After an SU BF weight is calculated based on step S1 and step S2 in the method 100, an MU BF weight is calculated according to the corrected algorithm, and then SINR correction is performed on the obtained MU BF weight according to the corrected algorithm.

V(t0) is a first single-user weight that is of the UE and that is calculated based on the actual downlink channel parameter at the moment t0, V(t1) is a second single-user weight that is of the UE and that is calculated based on the predicted downlink channel parameter H(t1) at the moment t1, and $V^H$(t1) is a conjugate transpose of the second single-user weight V(t1) of the UE. SINR$_{x,y}$ is a correction value after UE y pairing on an $x^{th}$ stream, ΔSINR$_{x,y}$ is a correction value before the UE y pairing on the $x^{th}$ stream, SINR$_y$ is an SINR value determined based on a channel quality indicator CQI of the UE y, and α$_{x,y}$ is an SINR correction coefficient after the UE y pairing on the $x^{th}$ stream.

Certainly, it should be noted that the foregoing three manners of Method 2 are merely optional implementations of this application, and constitute no limitation on the embodiments of this application. Any other specific implementation based on the foregoing manners shall fall within the protection scope of the embodiments of this application.

In conclusion, in this embodiment of this application, before the multi-user pairing, whether the UE is moving is identified, and after it is determined that the UE is moving, the downlink channel parameter of the UE is predicted, and the multi-user pairing operation is performed based on the predicted downlink channel parameter of the UE. Therefore, when UE moves, the base station can still determine a relatively accurate downlink channel of the moving UE, thereby improving beam accuracy of an electromagnetic wave corresponding to the moving UE and improving receiving performance of the moving UE.

Figure 5:
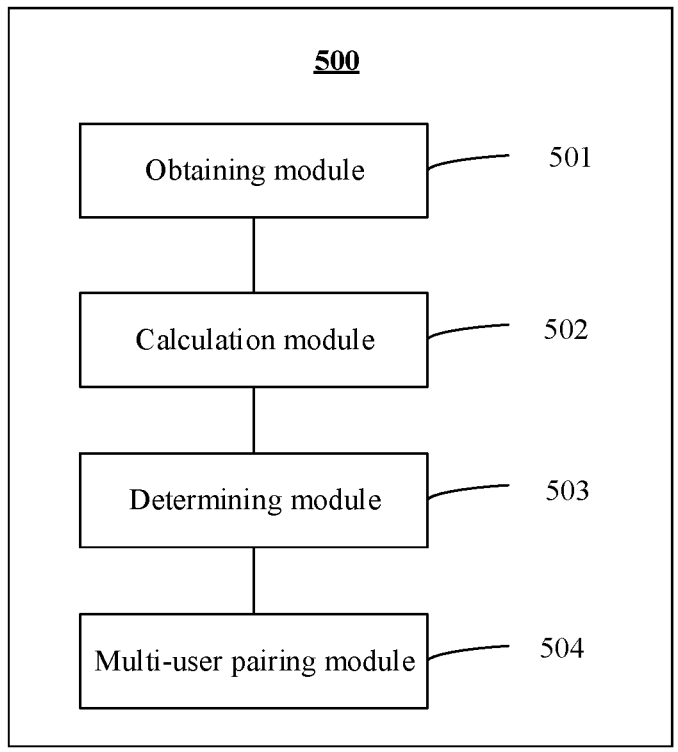
FIG. 5 is a schematic structural diagram of a multi-user pairing apparatus according to an embodiment of this application.

Corresponding to the method 300, FIG. 5 is a schematic structural diagram of a multi-user pairing apparatus 500 according to an embodiment of this application. The apparatus 500 may be applied to the method 300. As shown in FIG. 5, the apparatus 500 includes an obtaining module 501, a calculation module 502, a determining module 503, and a multi-user pairing module 504. The obtaining module 501 is configured to perform the step of obtaining, by a base station, an actual downlink channel parameter of UE in the method 300. The calculation module 502, the determining module 503, and the multi-user pairing module 504 are configured to perform various calculations in the method 300.

For example, the obtaining module 501 may be configured to obtain an actual downlink channel parameter of user equipment UE at a moment t0. The calculation module 502 may be configured to calculate a correlation coefficient between the actual downlink channel parameter at the moment t0 and an actual downlink channel parameter of the UE at a moment t0−Δt, where Δt is less than or equal to a preset time length. The determining module 503 may be configured to: when the correlation coefficient is less than a preset threshold, determine a predicted downlink channel parameter of the UE at a moment t1 based on the actual downlink channel parameter at the moment t0 and several consecutive actual downlink channel parameters that are adjacent to the actual downlink channel parameter at the moment t0 and that are before the moment t0, where the moment t1 is a sending moment after the moment t0. The multi-user pairing module 504 may be configured to perform a multi-user pairing operation based on the predicted downlink channel parameter at the moment t1.

For specific content, refer to descriptions of related parts in the embodiment of the method 300. Details are not described herein again.

Figure 6:
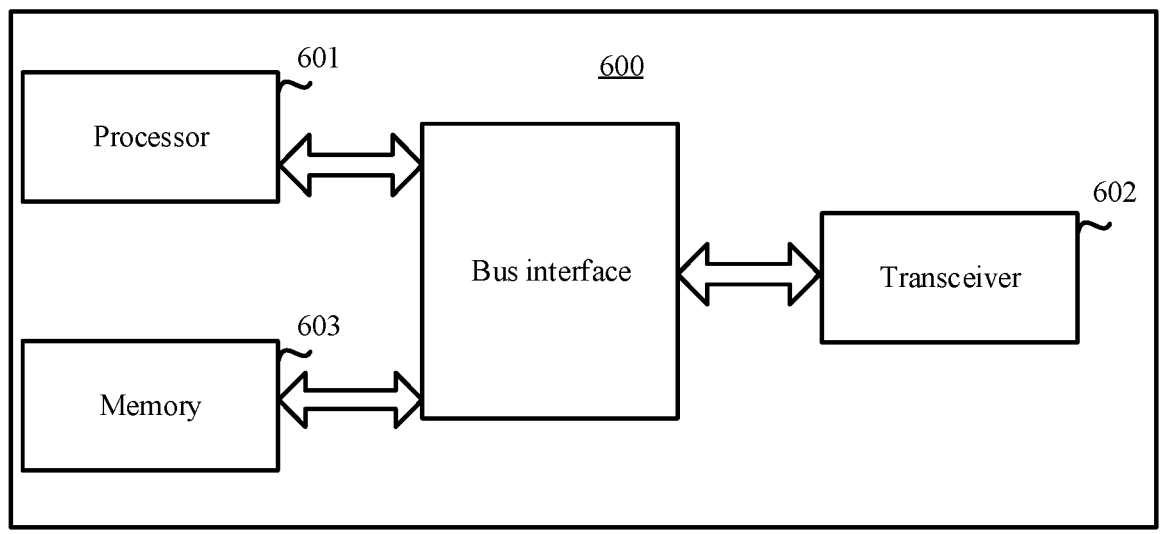
FIG. 6 is a schematic structural diagram of a base station according to an embodiment of this application.

It should be understood that division of the foregoing modules is merely logical function division. In actual implementation, all or a part of the modules may be integrated into one physical entity, or may be physically separated. In this embodiment of this application, the obtaining module 501 may be implemented by a transceiver, and the calculation module 502, the determining module 503, and the multi-user pairing module 504 may be implemented by a processor. As shown in FIG. 6, a base station 600 may include a processor 601, a transceiver 602, and a memory 603. The memory 603 may be configured to store a program/code pre-installed by the base station 600, or may store code or the like used for execution of the processor 601.

It should be understood that the base station 600 may correspond to the base station in the method 300 in the embodiments of this application. The transceiver 602 is configured to perform obtaining of an actual downlink channel parameter performed by the base station in the method 300, and the processor 601 is configured to perform other processing in the method 300 except the obtaining of the actual downlink channel parameter. Details are not described herein.

In specific implementation, corresponding to the base station 600, a computer storage medium is further provided according to an embodiment of this application. The computer storage medium disposed in the base station may store a program. When the program is executed, a part of or all of the steps of the multi-user pairing method provided in FIG. 3 may be performed. The storage medium in the base station may be a magnetic disk, an optical disc, a read-only memory (read-only memory, ROM), a random access memory (random access memory, RAM), or the like.

In this embodiment of this application, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof. The memory may include a volatile memory such as a random access memory (RAM), or the memory may include a non-volatile memory such as a read-only memory (ROM), a flash memory, a hard disk drive (HDD), or a solid-state drive (SSD), or the memory may include a combination of the foregoing types of memories.

FIG. 6 may further include a bus interface. The bus interface may include any quantity of interconnected buses and bridges, and specifically links various circuits of one or more processors represented by the processor and memories represented by the memory. The bus interface may further link together various other circuits, such as a peripheral device, a voltage stabilizer, and a power management circuit. This is well known in the art, and therefore is not further described in this specification. The bus interface provides an interface. The transceiver provides a unit configured to communicate with various other devices on a transmission medium. The processor is responsible for managing a bus architecture and normal processing. The memory may store data used when the processor is performing an operation.

A person skilled in the art may further understand that various illustrative logical blocks and steps that are listed in the embodiments of this application may be implemented by using electronic hardware, computer software, or a combination thereof. Whether the functions are implemented by using hardware or software depends on a particular application and a design requirement of an entire system. A person skilled in the art may use various methods to implement the described functions for each particular application, but it should not be considered that the implementation goes beyond the protection scope of the embodiments of this application.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any traditional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor so that the processor may read information from the storage medium and write information to the storage medium. Optionally, the storage medium may further be integrated into a processor. The processor and the storage medium may be arranged in an ASIC, and the ASIC may be arranged in UE. Optionally, the processor and the storage medium may further be arranged in different components of the UE.

It should be understood that sequence numbers of the processes do not mean execution sequences in various embodiments of this application. The execution sequences of the processes should be determined based on functions and internal logic of the processes, and should not be construed as any limitation on the implementation processes of the embodiments of this application.

All or a part of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state disk (SSD)), or the like.

The parts in this specification are all described in a progressive manner, for same or similar parts in the embodiments, refer to these embodiments, and each embodiment focuses on a difference from other embodiments. Especially, apparatus and device embodiments are basically similar to method embodiments, and therefore are described briefly. For related parts, refer to descriptions in the method embodiments.

Although embodiments of this application have been described, a person skilled in the art can make additional changes and modifications to these embodiments once they learn the basic inventive concept. Therefore, the following claims are intended to be construed to cover the embodiments and all changes and modifications falling within the scope of this application.

Obviously, a person skilled in the art can make various modifications and variations to this application without departing from the scope of this application. If these modifications and variations of this application fall within the scope of the claims of this application and their equivalent technologies, this application is also intended to cover these modifications and variations.

What is claimed is:

1. A multi-user pairing method, the method comprising:
   obtaining an actual downlink channel parameter of a user equipment (UE) at a moment t0;
   calculating a correlation coefficient between the actual downlink channel parameter at the moment t0 and an actual downlink channel parameter of the UE at a moment t0−Δt, wherein Δt is less than or equal to a preset time length;
   responsive to the correlation coefficient being less than a preset threshold, determining a predicted downlink channel parameter of the UE at a moment t1 based on the actual downlink channel parameter at the moment t0 and several consecutive actual downlink channel parameters that are adjacent to the actual downlink channel parameter at the moment t0 and that are before the moment t0, wherein the moment t1 is a sending moment after the moment t0; and
   performing a multi-user pairing operation based on the predicted downlink channel parameter at the moment t1 by:
   generating a correction parameter based on the predicted downlink channel parameter at the moment t1 and the actual downlink channel parameter at the moment t0; and
   performing the multi-user pairing operation based on the correction parameter.

2. The method according to claim 1, wherein the correction parameter ρ(t1) is defined as:

$$\rho(t1) = \frac{|H(t1)H^H(t0)|^2}{|H(t1)|^2},$$

wherein H(t1) is the predicted downlink channel parameter at the moment t1, and $H^H(t0)$ is a conjugate transpose of the actual downlink channel parameter at the moment t0; or
ρ(t1)=abs[$V^H$(t1)V(t0)], wherein V(t0) is a first single-user weight that is of the UE and that is calculated based on the actual downlink channel parameter at the moment t0, V(t1) is a second single-user weight that is of the UE and that is calculated based on the predicted downlink channel parameter H(t1) at the moment t1, and $V^H$(t1) is a conjugate transpose of the second single-user weight V(t1) of the UE.

3. The method according to claim 2, wherein responsive to the correction parameter ρ(t1) being defined as $$\rho(t1) = \frac{|H(t1)H^H(t0)|^2}{|H(t1)|^2},$$

the performing the multi-user pairing operation based on the correction parameter comprises:
   generating a target single-user beamforming (SU BF) weight based on the correction parameter ρ(t1); and
   performing the multi-user pairing operation based on the target SU BF weight; or
   performing the multi-user pairing operation based on the correction parameter ρ(t1) and the actual downlink channel parameter at the moment t0.

4. The method according to claim 2, wherein responsive to the correction parameter ρ(t1) being defined as ρ(t1)=abs[$V^H$(t1)V(t0)], a multi-user beamforming (MU BF) weight $W^{MU\text{-}BF}$ used for the multi-user pairing operation is defined as $W^{MU\text{-}BF}=V(V^H V+D(\rho(t1)))$, and D is a diagonal add-in; and
   a correction value $SINR_{x,y}$ used for the multi-user pairing operation, after UE y pairing on an $x^{th}$ stream is defined as $SINR_{x,y}=\alpha_{x,y}(\rho(t1))*SINR_y*\Delta SINR_{x,y}$, wherein $\Delta SINR_{x,y}$ is a correction value before the UE y pairing on the $x^{th}$ stream, $SINR_y$ is an SINR value determined based on a channel quality indicator CQI of the UE y, and $\alpha_{x,y}$ is an SINR correction coefficient after the UE y pairing on the $x^{th}$ stream.

5. The method according to claim 1, wherein the correlation coefficient between the actual downlink channel parameter at the moment t0 and the actual downlink channel parameter of the UE at the moment t0−Δt is defined as:

$$K(t0) = \frac{|H(t0)H^H(t0-\Delta t)|^2}{|H(t0)|^2},$$

wherein K(t0) is the correlation coefficient, H(t0) is the predicted downlink channel parameter at the moment t0, and $H^H(t0-\Delta t)$ is a conjugate transpose of the actual downlink channel parameter of the UE at the moment t0−Δt.

6. The method according to claim 1, wherein the determining the predicted downlink channel parameter at the moment t1 based on the actual downlink channel parameter at the moment t0 and several consecutive actual downlink channel parameters that are adjacent to the actual downlink channel parameter at the moment t0 and that are before the moment t0 comprises:

calculating the predicted downlink channel parameter H(t1) as:

$$H(t1) = \sum_{ti=tn}^{t0} A(ti)H(ti),$$

wherein tn is the earliest moment among moments corresponding to the several actual downlink channel parameters, A(ti) is a prediction coefficient, and H(ti) is an actual downlink channel parameter at a moment ti; or determining H(t1), in an interpolation manner, based on the actual downlink channel parameter at the moment t0 and a predicted downlink channel parameter H(t2) at a moment t2, wherein t2 is equal to t0+t, t is a periodicity for obtaining the actual downlink channel parameter, t2>t1, and the predicted downlink channel parameter H(t2) is defined as $$H(t2) = \sum_{ti=tn}^{t0} A(ti)H(ti),$$

wherein tn is the earliest moment among moments corresponding to the several actual downlink channel parameters, A(ti) is a prediction coefficient, and H(ti) is an actual downlink channel parameter at a moment ti.

7. The method according to claim 1, wherein the obtaining the actual downlink channel parameter at the moment t0 comprises:

receiving, at the moment t0, the actual downlink channel parameter sent by the UE; or receiving, at the moment t0, pilot information sent by the UE, and obtaining the actual downlink channel parameter by parsing the pilot information.

8. A multi-user pairing apparatus, the apparatus comprising:

a processor; and a non-transitory computer-readable storage medium coupled to the processor and storing programming instructions for execution by the processor, the programming instructions instruct the processor to:

obtain an actual downlink channel parameter of user equipment UE at a moment t0;

calculate a correlation coefficient between the actual downlink channel parameter at the moment t0 and an actual downlink channel parameter of the UE at a moment t0−Δt, wherein Δt is less than or equal to a preset time length;

responsive to the correlation coefficient being less than a preset threshold, determine a predicted downlink channel parameter of the UE at a moment t1 based on the actual downlink channel parameter at the moment t0 and several consecutive actual downlink channel parameters that are adjacent to the actual downlink channel parameter at the moment t0 and that are before the moment t0, wherein the moment t1 is a sending moment after the moment t0; and perform a multi-user pairing operation based on the predicted downlink channel parameter at the moment t1 by:

generating a correction parameter based on the predicted downlink channel parameter at the moment t1 and the actual downlink channel parameter at the moment t0, and performing the multi-user pairing operation based on the correction parameter.

9. The apparatus according to claim 8, wherein the correction parameter ρ(t1) is defined as:

$$\rho(t1) = \frac{|H(t1)H^H(t0)|^2}{|H(t1)|^2},$$

wherein H(t1) is the predicted downlink channel parameter at the moment t1, and $H^H(t0)$ is a conjugate transpose of the actual downlink channel parameter at the moment t0; or ρ(t1)=abs[$V^H$(t1)V(t0)], wherein V(t0) is a first single-user weight that is of the UE and that is calculated based on the actual downlink channel parameter at the moment t0, V(t1) is a second single-user weight that is of the UE and that is calculated based on the predicted downlink channel parameter H(t1) at the moment t1, and $V^H$(t1) is a conjugate transpose of the second single-user weight V(t1) of the UE.

10. The apparatus according to claim 9, wherein responsive to the correction parameter ρ(t1) being defined as $$\rho(t1) = \frac{|H(t1)H^H(t0)|^2}{|H(t1)|^2},$$

the programming instructions instruct the processor to:

generate a target single-user beamforming SU BF weight based on the correction parameter ρ(t1); and perform the multi-user pairing operation based on the target SU BF weight; or perform the multi-user pairing operation based on the correction parameter ρ(t1) and the actual downlink channel parameter at the moment t0.

11. The apparatus according to claim 9, wherein responsive to the correction parameter ρ(t1) being defined as ρ(t1)=abs[$V^H$(t1)V (t0)], an MU BF weight $W^{MU\text{-}BF}$ used for the multi-user pairing operation is defined as $W^{MU\text{-}BF}$=V($V^H$V+D(ρ(t1))), and D is a diagonal add-in; and a correction value $SINR_{x,y}$ used for the multi-user pairing operation, after UE y pairing on an $x^{th}$ stream is defined as $SINR_{x,y} = \alpha_{x,y}(\rho(t1))*SINR_y*\Delta SINR_{x,y}$, wherein $\Delta SINR_{x,y}$ is a correction value before the UE y pairing on the $x^{th}$ stream, is an SINR value determined based on a channel quality indicator CQI of the UE y, and $\alpha_{x,y}$ is an SINR correction coefficient after the UE y pairing on the $x^{th}$ stream.

12. The apparatus according to claim 8, wherein the correlation coefficient is defined as:

$$K(t0) = \frac{|H(t0)H^H(t0 - \Delta t)|^2}{|H(t0)|^2},$$

wherein K(t0) is the correlation coefficient, H(t0) is the predicted downlink channel parameter at the moment t0, and $H^H(t0-\Delta t)$ is a conjugate transpose of the actual downlink channel parameter of the UE at the moment $t0-\Delta t$.

13. The apparatus according to claim 8, wherein the programming instructions instruct the processor to:
   determine, according to $$H(t1) = \sum_{ti=tn}^{t0} A(ti)H(ti),$$

the predicted downlink channel parameter at the moment t1, wherein tn is the earliest moment among moments corresponding to the several actual downlink channel parameters, A(ti) is a prediction coefficient, and H(ti) is an actual downlink channel parameter at a moment ti; or
   determine the predicted downlink channel parameter, in an interpolation manner, based on the actual downlink channel parameter at the moment t0 and a predicted downlink channel parameter H (t2) at a moment t2, wherein t2 is equal to t0+t, t is a periodicity for obtaining the actual downlink channel parameter, t2>t1, and $$H(t2) = \sum_{ti=tn}^{t0} A(ti)H(ti),$$

wherein tn is the earliest moment among moments corresponding to the several actual downlink channel parameters, A(ti) is a prediction coefficient, and H(ti) is an actual downlink channel parameter at a moment ti.

14. The apparatus according to claim 8, wherein
   the programming instructions instruct the processor to:
      receive, at the moment t0, the actual downlink channel parameter sent by the UE; or receive, at the moment t0, pilot information sent by the UE, and obtain the actual downlink channel parameter by parsing the pilot information.

* * * * *